(12) United States Patent
Ueda et al.

(10) Patent No.: US 8,307,281 B2
(45) Date of Patent: Nov. 6, 2012

(54) PREDICTING CONVERSION CANDIDATES BASED ON THE CURRENT CONTEXT AND THE ATTRIBUTES OF PREVIOUSLY SELECTED CONVERSION CANDIDATES

(75) Inventors: Masaharu Ueda, Otsu (JP); Takuya Nakayama, Kyoto (JP)

(73) Assignee: Omron Corporation, Kyoto (JP)

( * ) Notice: Subject to any disclaimer, the term of this patent is extended or adjusted under 35 U.S.C. 154(b) by 331 days.

(21) Appl. No.: 12/431,799

(22) Filed: Apr. 29, 2009

(65) Prior Publication Data

US 2009/0278853 A1 Nov. 12, 2009

(30) Foreign Application Priority Data

May 12, 2008 (JP) ................................ 2008-124659

(51) Int. Cl.
*G06F 17/21* (2006.01)
(52) U.S. Cl. .......................... 715/264; 715/261; 715/262
(58) Field of Classification Search .................... 715/262
See application file for complete search history.

(56) References Cited

U.S. PATENT DOCUMENTS

| | | | | |
|---|---|---|---|---|
| 5,953,541 A * | 9/1999 | King et al. ....................... 710/67 |
| 2002/0126097 A1 * | 9/2002 | Savolainen ................... 345/168 |
| 2002/0158779 A1 * | 10/2002 | Ouyang .......................... 341/28 |
| 2004/0083198 A1 * | 4/2004 | Bradford et al. .................. 707/1 |
| 2005/0017954 A1 * | 1/2005 | Kay et al. ....................... 345/169 |
| 2005/0027524 A1 * | 2/2005 | Wu et al. ........................ 704/235 |
| 2005/0195171 A1 * | 9/2005 | Aoki et al. ..................... 345/172 |
| 2006/0048055 A1 * | 3/2006 | Wu et al. ........................ 715/535 |
| 2007/0288456 A1 * | 12/2007 | Aravamudan et al. ............. 707/5 |
| 2008/0195388 A1 * | 8/2008 | Bower et al. .................. 704/243 |
| 2009/0077496 A1 * | 3/2009 | Aravamudan et al. ........ 715/811 |
| 2010/0146386 A1 * | 6/2010 | Ma et al. ....................... 715/261 |

FOREIGN PATENT DOCUMENTS

| | | |
|---|---|---|
| JP | 7-271774 A | 10/1995 |
| JP | 8-83274 A | 3/1996 |
| JP | 11-3331 A | 1/1999 |
| JP | 2003-296320 A | 10/2003 |
| JP | 2004-178396 A | 6/2004 |
| JP | 2005-107749 A | 4/2005 |
| WO | WO 2007/114182 A1 | 10/2007 |

OTHER PUBLICATIONS

Korean Office Action for App. No. 10-2009-0040604, dated Nov. 12, 2010 (and English translation thereof).
Chinese Office Action for App. No. 200910140906.2, dated Dec. 21, 2010 (and English translation thereof).

* cited by examiner

*Primary Examiner* — Stephen Hong
*Assistant Examiner* — Asher Kells
(74) *Attorney, Agent, or Firm* — Dickstein Shapiro LLP

(57) ABSTRACT

This invention easily realizes a process of changing the display order of the candidates according to various input states. In a character input device of a mobile telephone, a wide variety of attributes representing an input state are set, and a conversion dictionary in which the attributes are registered in dictionary data of a corresponding word is set. An adjustment value setting unit determines the input state at a relative time point according to the start of input of the read character or the confirmation of the candidate, and sets an adjustment value to each attribute according to the determination content. A priority adjustment unit adjusts the priority with the adjustment value set to the attribute of the candidate for the candidate set with an attribute of each candidate extracted from the conversion dictionary by the read character string. A candidate display processing unit determines the display order of each candidate based on the priority after the adjustment process, and causes the display unit to display the candidate in the determined order.

6 Claims, 24 Drawing Sheets

| CATEGORY | NAME OF ATTRIBUTE | METHOD OF SETTING ADJUSTMENT VALUE |
|---|---|---|
| PERIOD OF TIME | MORNING | CORRESPONDED TO TIME AT START OF READ CHARACTER INPUT |
| | AFTERNOON | |
| | NIGHT | |
| SEASON | SPRING | CORRESPONDED TO MONTH AND DATE AT START OF READ CHARACTER INPUT |
| | SUMMER | |
| | AUTUMN | |
| | WINTER | |
| WORDING | CASUAL | |
| | FORMAL | |
| TENSE | PAST | UPDATE WHEN WORD REGISTERED WITH ATTRIBUTE OF SAME CATEGORY IS CONFIRMED |
| | FUTURE | |
| EMOTION | POSITIVE | |
| | NEGATIVE | |
| NOUN | NAME OF PERSON | SET WHEN CORRESPONDING INPUT MODE IS ACTIVATED, CANCEL AT TERMINATION OF MODE |
| | NAME OF PLACE | |
| BEGINNING | BEGINNING | SET BY START OF CREATION OF E-MAIL, CANCEL BY CONFIRMATION OF CANDIDATE OR CLEARING OF CANDIDATE DISPLAY |

| CATEGORY | NAME OF ATTRIBUTE | METHOD OF SETTING ADJUSTMENT VALUE |
|---|---|---|
| PERIOD OF TIME | MORNING | CORRESPONDED TO TIME AT START OF READ CHARACTER INPUT |
| | AFTERNOON | |
| | NIGHT | |
| SEASON | SPRING | CORRESPONDED TO MONTH AND DATE AT START OF READ CHARACTER INPUT |
| | SUMMER | |
| | AUTUMN | |
| | WINTER | |
| WORDING | CASUAL | UPDATE WHEN WORD REGISTERED WITH ATTRIBUTE OF SAME CATEGORY IS CONFIRMED |
| | FORMAL | |
| TENSE | PAST | |
| | FUTURE | |
| EMOTION | POSITIVE | |
| | NEGATIVE | |
| NOUN | NAME OF PERSON | SET WHEN CORRESPONDING INPUT MODE IS ACTIVATED, CANCEL AT TERMINATION OF MODE |
| | NAME OF PLACE | |
| BEGINNING | BEGINNING | SET BY START OF CREATION OF E-MAIL, CANCEL BY CONFIRMATION OF CANDIDATE OR CLEARING OF CANDIDATE DISPLAY |

FIG. 2

TABLE A CANDIDATE EXTRACTED BY INPUT OF "さ"

| DISPLAY ORDER | READING | CANDIDATE | PRIORITY | WORD ATTRIBUTE DATA |
|---|---|---|---|---|
| 1 | さいきん | 最近 | 20 | |
| 2 | さらに | さらに | 20 | |
| 3 | ざいりょう | 材料 | 10 | |
| 4 | ざんねん | 残念 | 5 | |
| 5 | ざっし | 雑誌 | 3 | |
| 6 | さいと | サイト | 2 | |
| 7 | さーびす | サービス | 1 | |
| 8 | さんだる | サンダル | 1 | SPRING, SUMMER |
| 9 | さんた | サンタ | 1 | WINTER |
| 10 | さんま | サンマ | 1 | AUTUMN |

TABLE B CANDIDATE EXTRACTED BY INPUT OF "たの"

| DISPLAY ORDER | READING | CANDIDATE | PRIORITY | WORD ATTRIBUTE DATA |
|---|---|---|---|---|
| 1 | たのもう | 頼もう | 20 | |
| 2 | たのしい | 楽しい | 19 | |
| 3 | たのしみ | 楽しみ | 18 | |
| 4 | たのしく | 楽しく | 17 | FUTURE |
| 5 | たのしむ | 楽しむ | 16 | |
| 6 | たのしかった | 楽しかった | 16 | PAST |
| 7 | たのみ | 頼み | 14 | |
| 8 | たのむ | 頼む | 13 | |

TABLE C CANDIDATE EXTRACTED BY INPUT OF "お"

| DISPLAY ORDER | READING | CANDIDATE | PRIORITY | WORD ATTRIBUTE DATA |
|---|---|---|---|---|
| 1 | おはよう | おはよう | 20 | MORNING |
| 2 | おつかれさま | お疲れさま | 20 | NIGHT |
| 3 | おげんき | お元気 | 15 | |
| 4 | おそく | 遅く | 14 | |
| 5 | おかえり | お帰り | 13 | NIGHT |
| 6 | おはよー | おはよー | 10 | MORNING, CASUAL |
| 7 | おつかれ | おつかれ | 10 | NIGHT, CASUAL |
| 8 | おはようございます | おはようございます | 9 | MORNING, FORMAL |
| 9 | おかえり | おかえり | 9 | NIGHT, CASUAL |
| 10 | おつかれさまです | お疲れ様です | 9 | NIGHT, FORMAL |

FIG. 3

TABLE D CANDIDATE EXTRACTED BY INPUT OF "s"

| DISPLAY ORDER | CANDIDATE | PRIORITY | WORD ATTRIBUTE DATA |
|---|---|---|---|
| 1 | SOME | 20 | |
| 2 | SAME | 10 | |
| 3 | SEE | 9 | WINTER |
| 4 | SEND | 8 | |
| 5 | SMALL | 7 | |
| 6 | SAY | 6 | |
| 7 | STUDENT | 5 | |
| 8 | SHOP | 5 | |
| 9 | SERVICE | 5 | |
| 10 | SPORTS | 4 | |
| 11 | SITUATION | 4 | |
| 12 | SALE | 3 | AUTUMN, WINTER |
| 13 | STORY | 3 | |
| 14 | SANTA CLAUS | 1 | WINTER |
| 15 | SANDAL | 1 | SPRING, SUMMMER |
| 16 | SEPTEMBER | 1 | SUMMER, AUTUMN |
| 17 | SEA | 1 | SUMMER |

FIG. 3 (CON'T)

TABLE E CANDIDATE EXTRACTED BY INPUT OF "h"

| DISPLAY ORDER | CANDIDATE | PRIORITY | WORD ATTRIBUTE DATA |
|---|---|---|---|
| 1 | HELLO | 20 | |
| 2 | HI | 20 | CASUAL |
| 3 | HEY | 15 | CASUAL |
| 4 | HOW ARE YOU? | 15 | MORNING, AFTERNOON |
| 5 | HAVE A NICE DAY. | 14 | MORNING, AFTERNOON |
| 6 | HOW ARE YOU DOING? | 13 | MORNING, AFTERNOON, CASUAL |
| 7 | HOW DO YOU DO? | 12 | MORNING, AFTERNOON, FORMAL |
| 8 | HAVE A GOOD WEEKEND. | 11 | |
| 9 | HOW HAVE YOU BEEN? | 10 | MORNING, AFTERNOON |
| 10 | HAVE A GOOD ONE. | 10 | NIGHT, CASUAL |
| 11 | HAPPY BIRTHDAY | 10 | |
| 12 | HOW'S IT GOING? | 9 | MORNING, AFTERNOON, CASUAL |
| 13 | HOW'S EVERYTHING? | 8 | MORNING, AFTERNOON |
| 14 | HAPPY NEW YEAR | 5 | |
| 15 | HAPPY HALLOWEEN | 2 | |

FIG. 3 (CON'T)

TABLE A-1 (WHEN "さ" IS INPUT IN SPRING), ADJUSTMENT VALUE: [SPRING] + 10, [SUMMER] 0, [AUTUMN] 0, [WINTER] 0

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | さいきん | 最近 | 20 |  | 0 | 20 |
| 2 | さらに | さらに | 20 |  | 0 | 20 |
| 3 | さんだる | サンダル | 1 | SPRING, SUMMER | 10 | 11 |
| 4 | ざいりょう | 材料 | 10 |  | 0 | 10 |
| 5 | ざんねん | 残念 | 5 |  | 0 | 5 |
| 6 | ざっし | 雑誌 | 3 |  | 0 | 3 |
| 7 | さいと | サイト | 2 |  | 0 | 2 |
| 8 | さーびす | サービス | 1 |  | 0 | 1 |
| 9 | さんた | サンタ | 1 | WINTER | 0 | 1 |
| 10 | さんま | サンマ | 1 | AUTUMN | 0 | 1 |

TABLE A-2 (WHEN "さ" IS INPUT IN AUTUMN), ADJUSTMENT VALUE: [SPRING] 0, [SUMMER] 0, [AUTUMN] +10, [WINTER] 0

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | さいきん | 最近 | 20 |  | 0 | 20 |
| 2 | さらに | さらに | 20 |  | 0 | 20 |
| 3 | さんま | サンマ | 1 | AUTUMN | 10 | 11 |
| 4 | ざいりょう | 材料 | 10 |  | 0 | 10 |
| 5 | ざんねん | 残念 | 5 |  | 0 | 5 |
| 6 | ざっし | 雑誌 | 3 |  | 0 | 3 |
| 7 | さいと | サイト | 2 |  | 0 | 2 |
| 8 | さーびす | サービス | 1 |  | 0 | 1 |
| 9 | さんだる | サンダル | 1 | SPRING, SUMMER | 0 | 1 |
| 10 | さんた | サンタ | 1 | WINTER | 0 | 1 |

FIG. 4

TABLE D-1 (WHEN "s" IS INPUT IN SPRING), ADJUSTMENT VALUE: [SPRING] +10, [SUMMER] 0, [AUTUMN] 0, [WINTER] 0

| DISPLAY ORDER | CANDIDATE | PRIORITY | WORD ATTRIBUTE DATA | ADJUSTMENT VALUE | FINAL PRIORITY |
|---|---|---|---|---|---|
| 1 | SOME | 20 | | 0 | 20 |
| 2 | SANDAL | 1 | SPRING, SUMMER | 10 | 11 |
| 3 | SAME | 10 | | 0 | 10 |
| 4 | SEE | 9 | WINTER | 0 | 9 |
| 5 | SEND | 8 | | 0 | 8 |
| 6 | SMALL | 7 | | 0 | 7 |
| 7 | SAY | 6 | | 0 | 6 |
| 8 | STUDENT | 5 | | 0 | 5 |
| 9 | SHOP | 5 | | 0 | 5 |
| 10 | SERVICE | 5 | | 0 | 5 |
| 11 | SPORTS | 4 | | 0 | 4 |
| 12 | SITUATION | 4 | | 0 | 4 |
| 13 | SALE | 3 | AUTUMN, WINTER | 0 | 3 |
| 14 | STORY | 3 | | 0 | 3 |
| 15 | SANTA CLAUS | 1 | WINTER | 0 | 1 |
| 16 | SEPTEMBER | 1 | SUMMER, AUTUMN | 0 | 1 |
| 17 | SEA | 1 | SUMMER | 0 | 1 |

FIG. 4 (CON'T)

TABLE D-2 (WHEN "s" IS INPUT IN WINTER), ADJUSTMENT VALUE: [SPRING] 0, [SUMMER] 0, [AUTUMN] 0, [WINTER] +10

| DISPLAY ORDER | CANDIDATE | PRIORITY | WORD ATTRIBUTE DATA | ADJUSTMENT VALUE | FINAL PRIORITY |
|---|---|---|---|---|---|
| 1 | SOME | 20 | | 0 | 20 |
| 2 | SEE | 9 | WINTER | 10 | 19 |
| 3 | SALE | 3 | AUTUMN, WINTER | 10 | 13 |
| 4 | SANTA CLAUS | 1 | WINTER | 10 | 11 |
| 5 | SAME | 10 | | 0 | 10 |
| 6 | SEND | 8 | | 0 | 8 |
| 7 | SMALL | 7 | | 0 | 7 |
| 8 | SAY | 6 | | 0 | 6 |
| 9 | STUDENT | 5 | | 0 | 5 |
| 10 | SHOP | 5 | | 0 | 5 |
| 11 | SERVICE | 5 | | 0 | 5 |
| 12 | SPORTS | 4 | | 0 | 4 |
| 13 | SITUATION | 4 | | 0 | 4 |
| 14 | STORY | 3 | | 0 | 3 |
| 15 | SANDAL | 1 | SPRING, SUMMER | 0 | 1 |
| 16 | SEPTEMBER | 1 | SUMMER, AUTUMN | 0 | 1 |
| 17 | SEA | 1 | SUMMER | 0 | 1 |

FIG. 4 (CON'T)

TABLE B-1 (WHEN "たの" IS INPUT AFTER "昨日" IS CONFIRMED), ADJUSTED VALUE: [PAST] +5, [FUTURE] 0

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | たのしかった | 楽しかった | 16 | PAST | 5 | 21 |
| 2 | たのもう | 頼もう | 20 | | 0 | 20 |
| 3 | たのしい | 楽しい | 19 | | 0 | 19 |
| 4 | たのしみ | 楽しみ | 18 | FUTURE | 0 | 18 |
| 5 | たのしく | 楽しく | 17 | | 0 | 17 |
| 6 | たのしむ | 楽しむ | 16 | | 0 | 16 |
| 7 | たのみ | 頼み | 14 | | 0 | 14 |
| 8 | たのむ | 頼む | 13 | | 0 | 13 |

TABLE B-2 (WHEN "たの" IS INPUT AFTER "明日" IS CONFIRMED), ADJUSTED VALUE: [PAST] 0, [FUTURE] +5

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | たのしみ | 楽しみ | 18 | FUTURE | 5 | 23 |
| 2 | たのもう | 頼もう | 20 | | 0 | 20 |
| 3 | たのしい | 楽しい | 19 | | 0 | 19 |
| 4 | たのしく | 楽しく | 17 | | 0 | 17 |
| 5 | たのしむ | 楽しむ | 16 | | 0 | 16 |
| 6 | たのしかった | 楽しかった | 16 | PAST | 0 | 16 |
| 7 | たのみ | 頼み | 14 | | 0 | 14 |
| 8 | たのむ | 頼む | 13 | | 0 | 13 |

FIG. 5

TABLE F-1 (WHEN "en" IS INPUT AFTER "COULD" IS CONFIRMED), ADJUSTMENT VALUE: [PAST] +5, [FUTURE] 0

| DISPLAY ORDER | CANDIDATE | PRIORITY | WORD ATTRIBUTE DATA | ADJUSTMENT VALUE | FINAL PRIORITY |
|---|---|---|---|---|---|
| 1 | ENLARGED | 18 | PAST | 5 | 23 |
| 2 | ENLARGE | 20 | | 0 | 20 |
| 3 | ENJOYED | 15 | PAST | 5 | 20 |
| 4 | ENJOYABLE | 19 | | 0 | 19 |
| 5 | ENJOYMENT | 18 | FUTURE | 0 | 18 |
| 6 | ENJOYABLY | 17 | | 0 | 17 |
| 7 | ENJOY | 16 | | 0 | 16 |
| 8 | ENLARGEMENT | 14 | | 0 | 14 |
| 9 | ENLARGER | 13 | | 0 | 13 |

TABLE F-2 (WHEN "en" IS INPUT AFTER "WILL" IS CONFIRMED), ADJUSTMENT VALUE: [PAST] 0, [FUTURE] +5

| DISPLAY ORDER | CANDIDATE | PRIORITY | WORD ATTRIBUTE DATA | ADJUSTMENT VALUE | FINAL PRIORITY |
|---|---|---|---|---|---|
| 1 | ENJOYMENT | 18 | FUTURE | 5 | 23 |
| 2 | ENLARGE | 20 | | 0 | 20 |
| 3 | ENJOYABLE | 19 | | 0 | 19 |
| 4 | ENLARGED | 18 | PAST | 0 | 18 |
| 5 | ENJOYABLY | 17 | | 0 | 17 |
| 6 | ENJOY | 16 | | 0 | 16 |
| 7 | ENJOYED | 15 | PAST | 0 | 15 |
| 8 | ENLARGEMENT | 14 | | 0 | 14 |
| 9 | ENLARGER | 13 | | 0 | 13 |

FIG. 5 (CON'T)

TABLE C-1 (WHEN "お" IS INPUT IN MORNING), ADJUSTMENT VALUE: [MORNING] +11, [NIGHT] -10

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | おはよう | おはよう | 20 | MORNING | 11 | 31 |
| 2 | おはよー | おはよー | 10 | MORNING, CASUAL | 11 | 21 |
| 3 | おはようございます | おはようございます | 9 | MORNING, FORMAL | 11 | 20 |
| 4 | おげんき | お元気 | 15 | | 0 | 15 |
| 5 | おそく | 遅く | 14 | | 0 | 14 |
| 6 | おつかれさま | お疲れさま | 20 | NIGHT | -10 | 10 |
| 7 | おかえり | お帰り | 13 | NIGHT | -10 | 3 |
| 8 | おつかれ | おつかれ | 10 | NIGHT, CASUAL | -10 | 0 |
| 9 | おかえり | おかえり | 9 | NIGHT, CASUAL | -10 | -1 |
| 10 | おつかれさまです | お疲れ様です | 9 | NIGHT, FORMAL | -10 | -1 |

FIG. 6

TABLE C-2 (WHEN "お" IS INPUT AT NIGHT), ADJUSTMENT VALUE: [MORNING] -10, [NIGHT] +11

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | おつかれさま | お疲れさま | 20 | NIGHT | 11 | 31 |
| 2 | おかえり | お帰り | 13 | NIGHT | 11 | 24 |
| 3 | おつかれ | おつかれ | 10 | NIGHT, CASUAL | 11 | 21 |
| 4 | おかえり | おかえり | 9 | NIGHT, CASUAL | 11 | 20 |
| 5 | おつかれさまです | お疲れ様です | 9 | NIGHT, FORMAL | 11 | 20 |
| 6 | おげんき | お元気 | 15 | | 0 | 15 |
| 7 | おそく | 遅く | 14 | | 0 | 14 |
| 8 | おはよう | おはよう | 20 | MORNING | -10 | 10 |
| 9 | おはよー | おはよー | 10 | MORNING, CASUAL | -10 | 0 |
| 10 | おはようございます | おはようございます | 9 | MORNING, FORMAL | -10 | -1 |

FIG. 6 (CON'T)

TABLE E-1 (WHEN "h" IS INPUT AT MORNING), ADJUSTMENT VALUE: [MORNING] +11, [NIGHT] 0

| DISPLAY ORDER | CANDIDATE | PRIORITY | WORD ATTRIBUTE DATA | ADJUSTMENT VALUE | FINAL PRIORITY |
|---|---|---|---|---|---|
| 1 | HAVE A NICE DAY. | 14 | MORNING, AFTERNOON | 11 | 25 |
| 2 | HOW ARE YOU DOING? | 13 | MORNING, AFTERNOON, CASUAL | 11 | 24 |
| 3 | HOW DO YOU DO? | 12 | MORNING, AFTERNOON, FORMAL | 11 | 23 |
| 4 | HOW HAVE YOU BEEN? | 10 | MORNING, AFTERNOON | 11 | 21 |
| 5 | HELLO | 20 | | 0 | 20 |
| 6 | HI | 20 | CASUAL | 0 | 20 |
| 7 | HOW'S IT GOING? | 9 | MORNING, AFTERNOON, CASUAL | 11 | 20 |
| 8 | HOW'S EVERYTHING? | 8 | MORNING, AFTERNOON | 11 | 19 |
| 9 | HEY | 15 | CASUAL | 0 | 15 |
| 10 | HOW ARE YOU? | 15 | MORNING, AFTERNOON | 0 | 15 |
| 11 | HAVE A GOOD WEEKEND | 11 | | 0 | 11 |
| 12 | HAVE A GOOD ONE | 10 | NIGHT, CASUAL | 0 | 10 |
| 13 | HAPPY BIRTHDAY | 10 | | 0 | 10 |
| 14 | HAPPY NEW YEAR | 5 | | 0 | 5 |
| 15 | HAPPY HALLOWEEN | 2 | | 0 | 2 |

FIG. 6 (CON'T)

TABLE E-2 (WHEN "h" IS INPUT AT NIGHT), ADJUSTMENT VALUE: [MORNING] 0, [NIGHT] +11

| DISPLAY ORDER | CANDIDATE | PRIORITY | WORD ATTRIBUTE DATA | ADJUSTMENT VALUE | FINAL PRIORITY |
|---|---|---|---|---|---|
| 1 | HAVE A GOOD ONE. | 10 | NIGHT, CASUAL | 11 | 21 |
| 2 | HELLO | 20 | | 0 | 20 |
| 3 | HI | 20 | CASUAL | 0 | 20 |
| 4 | HEY | 15 | CASUAL | 0 | 15 |
| 5 | HOW ARE YOU? | 15 | MORNING, AFTERNOON | 0 | 15 |
| 6 | HAVE A NICE DAY. | 14 | MORNING, AFTERNOON | 0 | 14 |
| 7 | HOW ARE YOU DOING? | 13 | MORNING, AFTERNOON, CASUAL | 0 | 13 |
| 8 | HOW DO YOU DO? | 12 | MORNING, AFTERNOON, FORMAL | 0 | 12 |
| 9 | HAVE A GOOD WEEKEND. | 11 | | 0 | 11 |
| 10 | HOW HAVE YOU BEEN? | 10 | MORNING, AFTERNOON | 0 | 10 |
| 11 | HAPPY BIRTHDAY | 10 | | 0 | 10 |
| 12 | HOW'S IT GOING? | 9 | MORNING, AFTERNOON, CASUAL | 0 | 9 |
| 13 | HOW'S EVERYTHING? | 8 | MORNING, AFTERNOON | 0 | 8 |
| 14 | HAPPY NEW YEAR | 5 | | 0 | 5 |
| 15 | HAPPY HALLOWEEN | 2 | | 0 | 2 |

FIG. 6 (CON'T)

(1)
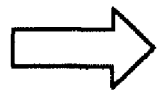
(2)
FIG. 7 (CON'T)

TABLE C-3 (WHEN "お" IS INPUT AFTER CONFIRMING "マネージャー"), ADJUSTMENT VALUE: [MORNING] +11, [NIGHT] -10, [FORMAL] +18, [CASUAL] 0

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | おはようございます | おはようございます | 9 | MORNING, HARD | 29 | 38 |
| 2 | おはよう | おはよう | 20 | MORNING | 11 | 31 |
| 3 | おはよー | おはよー | 10 | MORNING, CASUAL | 11 | 21 |
| 4 | おつかれさまです | お疲れ様です | 9 | NIGHT, FORMAL | 8 | 17 |
| 5 | おげんき | お元気 | 15 | | 0 | 15 |
| 6 | おそく | 遅く | 14 | | 0 | 14 |
| 7 | おつかれさま | お疲れさま | 20 | NIGHT | -10 | 10 |
| 8 | おかえり | お帰り | 13 | NIGHT | -10 | 3 |
| 9 | おつかれ | おつかれ | 10 | NIGHT, CASUAL | -10 | 0 |
| 10 | おかえり | おかえり | 9 | NIGHT, CASUAL | -10 | -1 |

FIG. 8

TABLE C-4 (WHEN "お" IS INPUT AFTER CONFIRMING "ちゃん"), ADJUSTMENT VALUE: [MORNING] +11, [NIGHT] -10, [FORMAL] 0, [CASUAL] 0

| DISPLAY ORDER | READING | CANDIDATE | PRIORITY | WORD ATTRIBUTE DATA | ADJUSTMENT VALUE | FINAL PRIORITY |
|---|---|---|---|---|---|---|
| 1 | おはよー | おはよー | 10 | MORNING, CASUAL | 29 | 39 |
| 2 | おはよう | おはよう | 20 | MORNING | 11 | 31 |
| 3 | おはようございます | おはようございます | 9 | MORNING, FORMAL | 11 | 20 |
| 4 | おつかれ | おつかれ | 10 | NIGHT, CASUAL | 8 | 18 |
| 5 | おかえり | おかえり | 9 | NIGHT, CASUAL | 8 | 17 |
| 6 | おげんき | お元気 | 15 |  | 0 | 15 |
| 7 | おそく | 遅く | 14 |  | 0 | 14 |
| 8 | おつかれさま | お疲れさま | 20 | NIGHT | -10 | 10 |
| 9 | おかえり | お帰り | 13 | NIGHT | -10 | 3 |
| 10 | おつかれさまです | お疲れ様です | 9 | NIGHT, FORMAL | -10 | -1 |

FIG. 8 (CON'T)

TABLE E-3 (WHEN "h" IS INPUT AFTER CONFIRMING "MR."), ADJUSTMENT VALUE: [MORNING] +11, [NIGHT] -10, [FORMAL] +18, [CASUAL] 0

| DISPLAY ORDER | CANDIDATE | PRIORITY | WORD ATTRIBUTE DATA | ADJUSTMENT VALUE | FINAL PRIORITY |
|---|---|---|---|---|---|
| 1 | HOW DO YOU DO? | 12 | MORNING, AFTERNOON, FORMAL | 18 | 30 |
| 2 | HOW ARE YOU? | 15 | MORNING, AFTERNOON | 11 | 26 |
| 3 | HAVE A NICE DAY. | 14 | MORNING, AFTERNOON | 11 | 25 |
| 4 | HOW ARE YOU DOING? | 13 | MORNING, AFTERNOON, CASUAL | 11 | 24 |
| 5 | HOW HAVE YOU BEEN? | 10 | MORNING, AFTERNOON | 11 | 21 |
| 6 | HELLO | 20 | | 0 | 20 |
| 7 | HI | 20 | CASUAL | 0 | 20 |
| 8 | HOW'S IT GOING? | 9 | MORNING, AFTERNOON, CASUAL | 11 | 20 |
| 9 | HOW'S EVERYTHING? | 8 | MORNING, AFTERNOON | 11 | 19 |
| 10 | HEY | 15 | CASUAL | 0 | 15 |
| 11 | HAVE A GOOD WEEKEND | 11 | | 0 | 11 |
| 12 | HAPPY BIRTHDAY | 10 | | 0 | 10 |
| 13 | HAPPY NEW YEAR | 5 | | 0 | 5 |
| 14 | HAPPY HALLOWEEN | 2 | | 0 | 2 |
| 15 | HAVE A GOOD ONE | 10 | NIGHT, CASUAL | -10 | 0 |

FIG. 8 (CON'T)

TABLE E-4 (WHEN "h" IS INPUT AFTER CONFIRMING "MISA"), ADJUSTMENT VALUE: [MORNING] +11, [NIGHT] -10, [FORMAL] 0, [CASUAL] +18

| DISPLAY ORDER | CANDIDATE | PRIORITY | WORD ATTRIBUTE DATA | ADJUSTMENT VALUE | FINAL PRIORITY |
|---|---|---|---|---|---|
| 1 | HI | 20 | CASUAL | 18 | 38 |
| 2 | HEY | 15 | CASUAL | 18 | 33 |
| 3 | HOW ARE YOU DOING? | 13 | MORNING, AFTERNOON, CASUAL | 18 | 31 |
| 4 | HOW DO YOU DO? | 12 | MORNING, AFTERNOON, FORMAL | 18 | 30 |
| 5 | HOW'S IT GOING? | 9 | MORNING, AFTERNOON, CASUAL | 18 | 27 |
| 6 | HOW ARE YOU? | 15 | MORNING, AFTERNOON | 10 | 25 |
| 7 | HAVE A NICE DAY. | 14 | MORNING, AFTERNOON | 10 | 24 |
| 8 | HELLO | 20 | | 0 | 20 |
| 9 | HOW HAVE YOU BEEN? | 10 | MORNING, AFTERNOON | 10 | 20 |
| 10 | HOW'S EVERYTHING? | 8 | MORNING, AFTERNOON | 10 | 18 |
| 11 | HAVE A GOOD ONE. | 10 | NIGHT, CASUAL | 8 | 18 |
| 12 | HAVE A GOOD WEEKEND. | 11 | | 0 | 11 |
| 13 | HAPPY BIRTHDAY | 10 | | 0 | 10 |
| 14 | HAPPY NEW YEAR | 5 | | 0 | 5 |
| 15 | HAPPY HALLOWEEN | 2 | | 0 | 2 |

FIG. 8 (CON'T)

PREDICTING CONVERSION CANDIDATES BASED ON THE CURRENT CONTEXT AND THE ATTRIBUTES OF PREVIOUSLY SELECTED CONVERSION CANDIDATES

BACKGROUND OF THE INVENTION

1. Technical Field

The present invention relates to a program for causing a computer connected with an operation unit and a display unit to function as a character input device for accepting input of a read character string from the operation unit, converting the read character string to a kana/kanji character string, and outputting the converted character string to a higher level application, the character input device, and a character input method.

2. Related Art

In a device of a type in which character input operation is performed using a ten key such as a mobile telephone, a dictionary file is searched by the read character string at a relevant time point every time the read character string is updated by the key operation, a candidate character string is extracted, and the extracted candidate is displayed in a list to cover the poorness in operability. According to such a function (hereinafter referred to as a "prediction conversion function"), a user can select the target character string in the displayed candidates to complete the character conversion process without inputting all read character strings.

In candidate extraction by the prediction conversion function, the selected results of the most recent candidate and the candidate having a high frequency selected in the past are generally displayed at a higher level. However, in such display, the character string intended by the user may not be displayed at the higher level, and thus development of software having a mechanism of changing the display order of each candidate according to the input state is desired.

In regards to such a problem, Japanese Unexamined Patent Publication No. 11-3331 describes obtaining a score of each field (fitness of each field with respect to document being created) using the usage frequency (registered in advance) for every type of field of various words contained in the document created up to a relevant point when the read character string is input, determining the field of the document being created from the score, and narrowing the candidates. Japanese Unexamined Patent Publication No. 2003-296320 describes classifying various words by the timing in which the possibility the word is input is high so that when a plurality of date dictionary tables is created and the read character string is input, the date of a clock in the device is referenced and the table corresponding to the date is searched to thereby display the candidate corresponding to the input timing at a higher level.

SUMMARY

The present invention described in Japanese Unexamined Patent Publication No. 11-3331 assumes that a long document of a certain extent is input, and it is difficult to perform an appropriate candidate display immediately after starting the creation of the document or when the creation is terminated with a short sentence. Furthermore, with this method, the score is calculated through a calculation using weight based on the frequency of various words contained in the document being created and the relative position of the words in the document for every type of field, and thus the load of the calculation becomes enormous, and it is difficult to be applied to a system of a type for extracting and displaying the candidates every time the read character string is updated.

In the invention described in Japanese Unexamined Patent Publication No. 2003-296320, a word dictionary table of a normal configuration is provided other than being registered with a plurality of date dictionary tables. The word dictionary table needs to be recorded even with all words registered in each date dictionary table (the word of an unusual timing cannot be called out unless the words registered in each date dictionary table are separately registered), and thus the memory capacity for storing the dictionary data increases. In dictionary searching, both the search on the date dictionary table corresponding to the date data obtained from the clock and the search on the word dictionary table need to be executed, and thus it becomes difficult to increase the speed of the process.

The present invention has been devised to solve the problems in the related art described above, and an object thereof is to easily realize a process of changing the display order of the candidates according to various input states.

In accordance with one aspect of the present invention, the invention is directed to a character input program incorporating, in a computer, a conversion dictionary including a plurality of dictionary data in which a priority is corresponded to a read character string and a converted character string, and causing the computer to function as each means of read character assembly means for assembling a read character string according to input of a read character; a candidate predicting section for extracting the converted character string that prefix matches the read character string updated from the conversion dictionary as a candidate every time the read character string is updated, and displaying the extracted candidate character strings in a predetermined order; and confirmation outputting means for confirming the selected candidate character string according to a selection operation on the displayed candidate and outputting the confirmed character string to a higher level application operating on the computer; wherein each of a wide variety of attributes representing an input state is corresponded to a predetermined number of dictionary data in the conversion dictionary; and the candidate predicting section includes adjustment value setting means for determining the input state based on an operation state of the computer where the program is installed or a device incorporating the computer and setting a numerical value of a predetermined magnitude to each attribute as an adjustment value of the priority according to the determination content, priority adjustment means for adjusting the priority of the candidate extracted by the read character string based on the attribute corresponding to the candidate and the adjustment value set by the adjustment value setting means, and display order determining means for determining the display order of each candidate based on the priority after the process by the priority adjustment means.

In the above description, the "input state" means in what state the current character input is being made. For instance, the "input state" includes the timing the character input is executed, the expressive form of the sentences being created, the input mode in the device, and the like. In the conversion dictionary by the program according to the present invention, each of a wide variety of attributes representing the input state is corresponded to a predetermined number of dictionary data, but some dictionary data may not be corresponded with any attribute or may corresponded with a variety of attributes.

BRIEF DESCRIPTION OF THE DRAWINGS

FIG. 2 is a table summarizing the type of attribute and the method of setting the adjustment value;

FIG. 3 is a table showing the dictionary data of the candidate extracted according to the read character string "さ", "たの", and "お" (which are Japanese characters) in order of priority;

FIG. 4 is a table showing a specific example of a priority adjustment process of each candidate of table A;

FIG. 5 is a table showing a specific example of the priority adjustment process of each candidate of table B;

FIG. 6 is a table showing a specific example of the priority adjustment process of each candidate of table C;

FIG. 8 is a table showing the priority adjustment process corresponding to the example of FIG. 7;

DETAILED DESCRIPTION

Figure 1:
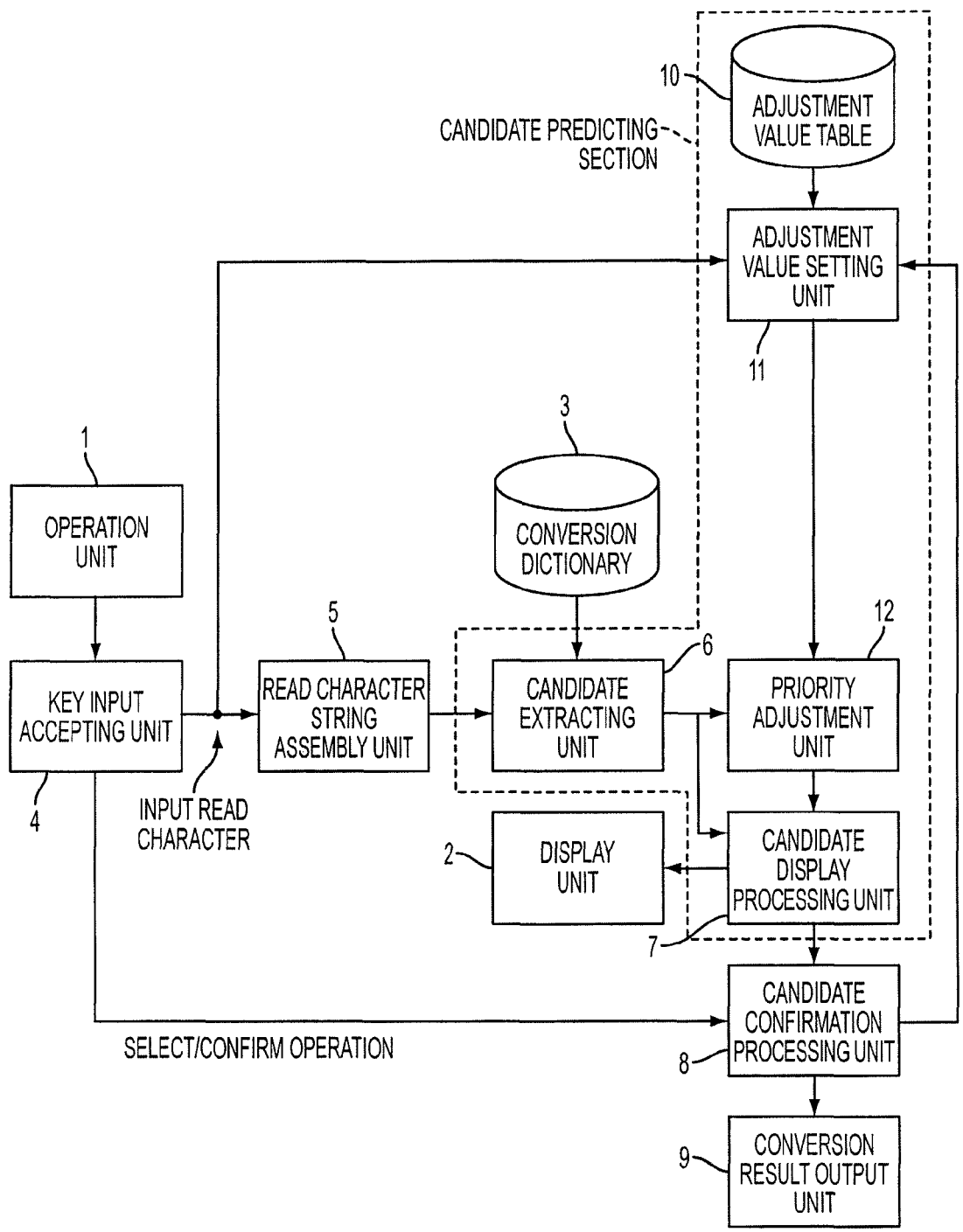
FIG. 1 is a function block diagram of a character input device.

FIG. 1 is a function block diagram of a character input device in a mobile telephone.

The character input device is provided to input character data to a higher level application such as an electronic mail editor, and includes an operation unit 1, a display unit 2, a conversion dictionary 3, a key input accepting unit 4, a read character string assembly unit 5, a candidate extracting unit 6, a candidate display processing unit 7, a candidate confirmation processing unit 8, a conversion result output unit 9, an adjustment value table 10, an adjustment value setting unit 11, a priority adjustment-unit 12, and the like.

In such a configuration, the operation unit 1 and the display unit 2 are hardware provided in the device main body. The operation unit 1 is provided with ten key and a plurality of function keys (none of which are shown) for inputting the read character, and the display unit 2 displays the screen of the higher level application, list of candidates for character input, and the like.

The conversion dictionary 3 is stored with great number of dictionary data of a configuration in which read character string by kana, priority, word attribute data, to be hereinafter described, and the like are corresponded to the converted character string (include pictographic character and face mark in addition to kana/kanji character string) which is the input target. In FIG. 1, the conversion dictionary 3 is shown as one data file, but individual dictionary file may be provided by word class and self-sufficient word/attached word.

The key input accepting unit 4 accepts the operation on the operation unit 1, and notifies which key is operated to the read character string assembly unit 5 when the ten key is operated. The read character string assembly unit 5 recognizes the read character input by operation and updates the read character string for every operation (the tail character of the read character string is changed if the key same as the previous time is operated, and a new character is added to the read character string if the key different from the previous time is operated) according to the notification.

The candidate extracting unit 6 searches the conversion dictionary 3 with the new read character string every time the read character string is updated by the read character string assembly unit 5, and extracts the word that prefix matches the read character string as candidates. The candidate display processing unit 7 displays each extracted candidate on the display unit 2 in the order based on the respective priority.

Therefore, with the execution of the processes by the read character string assembly unit 5, the candidate extracting unit 6, and the candidate display processing unit 7 every time the read character is input, the content of the candidate display is switched according to the input operation of the read character. When the operation of selecting and confirming one of the candidates displayed at a predetermined time point is performed, such operation is transmitted to the candidate confirmation processing unit 8 after being accepted by the key input accepting unit 4, and the process of confirming the selected candidate is executed. The character string of the confirmed candidate is output to the higher level application by the conversion result output unit 9.

In the above description, the priority contained in each dictionary data of the conversion dictionary 3 is defined based on the usage frequency of various words derived by statistical processing and the like, and the candidate display processing unit 7 displays the extracted candidates in the order of high priority. In this embodiment, the range including the adjustment value table 10, the adjustment value setting unit 11, and the priority adjustment unit 12 function as a candidate predicting section in addition to the candidate extracting unit 6 and the candidate display processing unit 7, where the priority of the candidate to be displayed is adjusted before displaying the candidate.

The process of adjusting the priority will be described in detail below.

In the conversion dictionary 3 of this embodiment, the state (hereinafter referred to as an "input state") of when the word by the dictionary data is input is registered as "attribute" in each dictionary data. Specifically, the "word attribute data" including names (attribute names) are registered in the dictionary data of the corresponding word targeting on 16 attributes shown in FIG. 2.

In the adjustment value setting unit 11, the adjustment value of the priority is set to each attribute according to the current input state (specific adjustment value is registered in the adjustment value table 10, which is referenced according to the input state), and each set value is provided to the priority adjustment unit 12. In the priority adjustment unit 12, if a candidate registered with an attribute exists in the candidates extracted by the candidate extracting unit 6, the priority of the relevant candidate is adjusted by the adjustment value set to the registered attribute. In the candidate display processing unit 7, the display order of each candidate is determined based on the priority after the adjustment process, and thus the display order of the candidates can be changed according to the input state at any given time even if the same read character string is input.

FIG. 2 shows the method of setting the type of attribute registered in the dictionary data and the respective adjustment value in the form of a table.

In this embodiment, each attribute is classified into seven categories of [period of time], [season], [wording], [tense], [emotion], [noun], and [beginning], and the adjustment value of the priority is updated in units of categories.

The [period of time] and the [season] represent the timing the character input is made. The [period of time] includes three types of attributes of [morning], [afternoon] and [night], and the [season] includes four types of attributes of [spring], [summer], [autumn], and [winter]. The attribute of the [season] can be classified into finer range (e.g., units of months).

In relation to the two categories, when the input of the read character is started (when the ten key is operated under a state in which non-confirmed read character string is not present), the internal clock (not shown) is referenced to recognize the current time, and month and date. The adjustment value of a positive value is set to the attribute adapted to the time in the [period of time] and the attribute adapted to the month and date in the [season]. The adjustment value of the attribute that is not adapted to the time or the month and date is set to zero or a negative value.

The [wording], the [tense], and the [emotion] represent the expressive form of the document created. Such categories are set with two types of attributes which concept, contradict each other.

[Casual] of the [wording] is the expressive form of strong affinity, and [formal] is a polite expressive form. [Past] of the [tense] is the expressive form in past tense, and [future] is the expressive form in future tense. [Positive] of the [emotion] is the expressive form representing uplifting feeling such as happy and fun, and [negative] is the expressive form representing depressed feeling such as sad and regret.

With respect to such three types of categories, the adjustment values of all attributes are set to zero at the beginning, but the adjustment value of the respective attribute is set to a positive value when the word registered with the attribute of the same category is confirmed. Thereafter, every time the word registered with the attribute representing the expressive form is confirmed, the adjustment value corresponding to the attribute of the confirmed word is set to a positive value. If the positive adjustment value is set to the attribute of a concept contradicting the attribute of the confirmed word, the relevant adjustment value is changed to zero or a negative value.

The adjustment value is mainly updated according to the confirmation of the candidate in time of character input, but in the [wording], the adjustment value may be set according to the confirmation of the address of an e-mail, as hereinafter described.

The [noun] represents the state of inputting proper noun, and is set with two types of attributes, [name of person] and [name of place]. The [name of person] refers to a state of inputting a name of a person, and the [name of place] refers to a state of inputting a name of a place.

The adjustment value of the [noun] is also set to zero at the beginning, but a positive value is set to the adjustment value of the relevant attribute when an input mode corresponding to one of the attributes contained in the category is activated.

For example, the adjustment value of the [name of person] becomes a positive value when the input of a name of a person is selected to register or edit the address book, and the adjustment value of the [name of place] becomes a positive value when the navigation application is activated, and the input of a name of a place is selected. The attribute value of the corresponding attribute is also set to the positive value when the operation of selecting the input mode of the name of a person or the input mode of the name of a place is performed and the selected input mode is activated while creating an e-mail document.

In regards to the [noun], the set positive adjustment value is canceled (zero reset) in response to the termination of the corresponding input mode.

Lastly, the [beginning] represents the state the creation of the e-mail document is started and the word at the beginning is to be input. This category is set with only the attribute of the name [beginning], similar to the name of the category.

Figure 10:
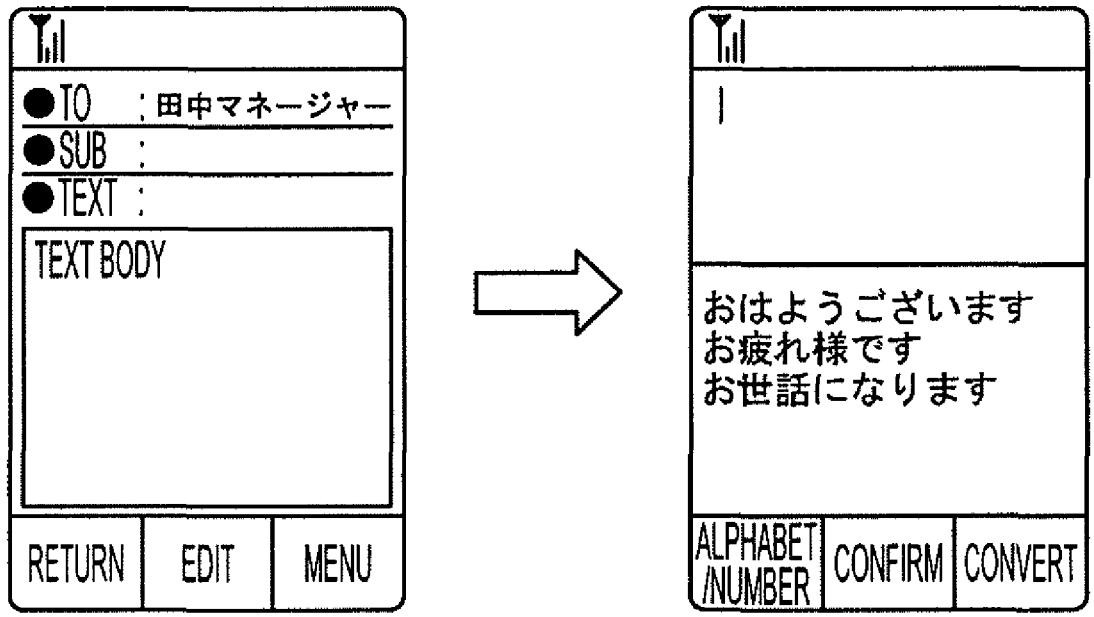
FIGS. 10(1) and 10(2) are explanatory views showing a relationship of display and address of the candidate at the beginning of an e-mail document.
Figure 10:
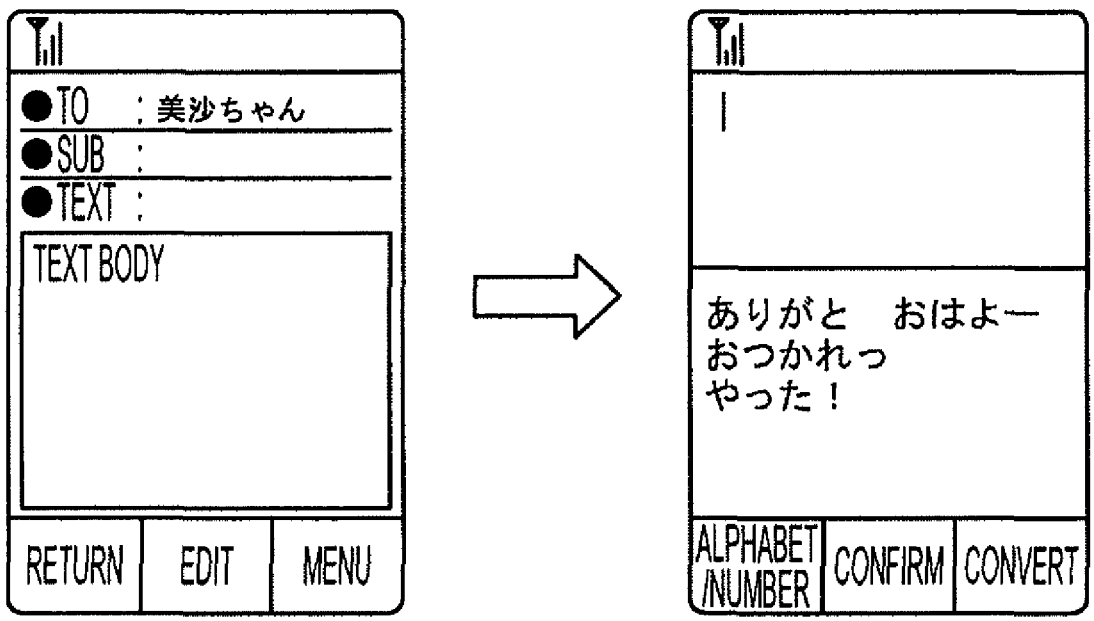

The adjustment value of the [beginning] is set to a positive value when the creation of the e-mail is started, which is canceled when a confirming operation is performed on the display (shown in FIGS. 10(1) and 10(2)) of the candidate having the attribute [beginning] or when the candidate display is cleared. However, the setting of the adjustment value is performed only when the mode of making the call-out of the beginning candidate is selected by the user in advance.

As described above, in this embodiment, the positive value is set to the adjustment value of the attribute adapted to the input state, and zero or the negative value is set to the adjustment value of the attribute not adapted to the input state. The specific adjustment value is determined for every category in advance and registered in the adjustment value table 10, so that the adjustment value setting unit 11 can define the adjustment value every hour by referencing the adjustment value table 10.

The priority adjustment unit 12 adjusts the priority of each candidate extracted by the candidate extracting unit 6 through a method of adding the adjustment value of the attribute registered to the relevant candidate to the respective priority. The candidate not registered with the attribute is not the target of adjustment. For the candidate registered with a plurality of attributes, the total value of the adjustment value set to such attributes is added to the priority. Therefore, the priority can be increased than the original priority with respect to the candidate having the attribute set with the positive adjustment value, whereby such a candidate is more likely to be displayed at a higher level.

The three tables A, B, and C shown in FIG. 3 show, in an abstracted manner, the dictionary data of the candidate extracted from the conversion dictionary when "さ", "たの", and "お" (which are Japanese characters) are respectively input as the read character string (numerous words are actually displayed, but the number of candidates is limited to 10 in each table to simplify the explanation). In each table, the "candidate" is the character string after conversion, and "read" is the read character string before conversion. The blank in "word attribute data" is the candidate not recorded with the attribute indicating the input state.

Specific examples of the priority adjustment will be described with the candidates shown in the tables by way of example. In the tables described below, the dictionary data of each word is shown in order of high priority after the adjustment, and the adjustment value used in the adjustment as well as the priority after the adjustment (hereinafter referred to as a "final priority") are shown in correspondence to the dictionary data. The candidates not registered with the attribute are not performed with the priority adjustment process, but the final priority is shown with the adjustment value as zero in the tables for convenience.

FIG. 4 shows an example where the display order of each candidate shown in table A is changed by the timing of input.

According to table A, three words ("サンダル", "サンダ", and "サンマ" (which are Japanese characters)) having the attribute of the [season] are extracted by the input of the read character string "さ". As described above, since the [season] sets the adjustment value of each attribute based on the month and date data at a time point every time the input of the read character is started, the priorities of the three candidates can be changed according to the timing the input is made.

In the example of FIG. 4, with respect to the [season], the adjustment value of the attribute adapted to the month and date data at the time point the input of the read character is started is set to +10, and the adjustment value of other attributes is set to zero. Therefore, when input is made in spring, the adjustment value of [spring] becomes +10, and each adjustment value of [summer], [autumn], and [winter] becomes zero.

The table A-1 of FIG. 4 corresponds to when the read character string "さ" is input in spring (March to May). According to table A-1, the adjustment value is +10 in "サンダル" having the attribute of [spring] of the extracted candidates, but the adjustment value is zero in "サンマ" and "サンタ" having other attributes of the [season].

The usual priority of "サンダル" is one, but the final priority is 11 as the adjustment value is added to the priority. With respect to each candidate other than the "サンダル" the final priority is the same as the usual priority as the adjustment value is zero. As a result, only the priority of the "サンダル" of the candidates having the attribute of the [season] is greatly increased, and the display order becomes the third.

As [summer] is also registered for the attribute of the "サンダル", effects similar to the above are obtained when the same read character "さ" is input in the summer.

The table A-2 of FIG. 4 corresponds to when the read character string "さ" is input in autumn (September to November). In this cases the adjustment value of +10 is set for [autumn] of each attribute of the [season], and the adjustment value of other attributes is set to zero, and thus the adjustment value of +10 is set to "サンマ" having the attribute of [autumn], and the adjustment value of other candidates including "サンダル" is set to zero. In this case, therefore, the final adjustment value of "サンマ" becomes 11, and the final adjustment value of "サンダル" remains the usual one, whereby the "サンマ" becomes the third, and the "サンダル" becomes the ninth.

FIG. 5 shows an example where the display order of each candidate shown in table B is changed according to the attribute of the word confirmed before.

The table B includes two candidates ("楽しかった" and "楽しみ" (which are Japanese character)) set with the attribute of the [tense]. The adjustment value with respect to the attribute of the [tense] is updated when the word set with the attribute of the relevant category is confirmed, as described above. In the example of FIG. 5, the adjustment value of +5 is set to the attribute of the confirmed word, and the adjustment value of other attributes is set to zero.

The table B-1 of FIG. 5 corresponds to when the read character string "た" is input after the word registered with the attribute of [past] such as "昨日" (Japanese character) is confirmed. In this case, since the adjustment value of +5 is set to the "楽しかった" in which [past] is registered for the attribute, the final priority of the word is set to a value higher than usual. The adjustment value is zero in "楽しみ" in which [future] is registered for the attribute or the candidate in which other attributes are not set, and thus the final priority thereof becomes the value same as usual.

The table B-2 corresponds to when the read character string "たの" is input after the word registered with the attribute of [future] such as "明日" (Japanese character) is confirmed. In this case, since the adjustment value of +5 is set to "楽しみ", the final priority of the relevant word is set to a value higher than usual. The adjustment value of other candidates including "楽しかった" is zero, and thus the final priority is the value same as usual.

According to the adjustment process described above, "楽しかった" becomes the first in the input of after the word "昨日" is confirmed, and "楽しみ" becomes the first in the input of after the word "明日" is confirmed. Thus, when the word having the attribute representing the input expression is confirmed, the candidate having the attribute same as the confirmed word is thereafter easily displayed at a higher level.

FIG. 6 shows an example where the display order of each candidate shown in table C is changed by the period of time the read character string is input.

According to table C, the candidates extracted by the input of the read character string "お" includes, a plurality of candidates registered with [morning] and a plurality of candidates registered with [night] as the attribute of the [period of time]. Furthermore, the candidates registered with the attribute of the [period of time] include the candidates registered with the attribute ([formal] or [casual]) of the [wording] and the candidates registered with only the attribute of the [period of time].

In the example of FIG. 6, the adjustment value of +11 is set to the attribute adapted to the time data acquired in response to the start of input of the read character of the attribute of the [period of time]. Furthermore, if the adjustment value of positive value is set to [morning] or [night], the adjustment value of −10 is set to the attribute of the concept contradicting thereto (adjustment value of [afternoon] remains zero, or the candidate having such an attribute does not exist, and thus will not be considered here). According to such setting, the order of each candidate registered with the attribute of the [period of time] can be changed according to the period of time of the input.

This will be specifically described using each table C-1 and C-2. If the input of the character string "お" is made in the morning, the final priority is set to a value higher than usual for "おはよう" "おはよー" and "おはようございます"(which are Japanese characters) having the attribute of [morning] as the adjustment value of +11 is added to the usual priority, as shown in table C-1. For "お疲れ様", "お帰り", "おつかれ", "おかえり", and "お疲れ様です"(which are Japanese characters) having the attribute of [night], the final priority is a value lower than usual as the adjustment value of −10 is added to the usual priority. As a result, the three candidates having the attribute of [morning] are ranked in the top three, and the five candidates having the attribute of [night] are ranked in sixth to tenth.

If the input of the character string "お" is made at night, +11 is added to the respective priority of the five candidates having the attribute of [night], and −10 is added to the respective priority of the three candidates having the attribute [morning], as shown in table C-2. In this case, the final priority of each candidate having the attribute of [night] is increased so that such candidates occupy the higher levels, and each candidate having the attribute of [morning] is ranked in eighth to tenth.

According to the example of FIG. 6, the candidate adapted to the timing of input can be more easily ranked at the higher level since the priority of the candidate having the attribute adapted to the timing of input is increased by the positive adjustment value and the priority of the candidate having the attribute of a concept contradicting the timing of input is lowered by the negative adjustment value.

In the example of FIG. 6, all adjustment values with respect to the attribute of the [wording] are assumed to be set to zero. The display order is more different if the adjustment value other than zero is set to the attribute of the [wording].

Figure 7:
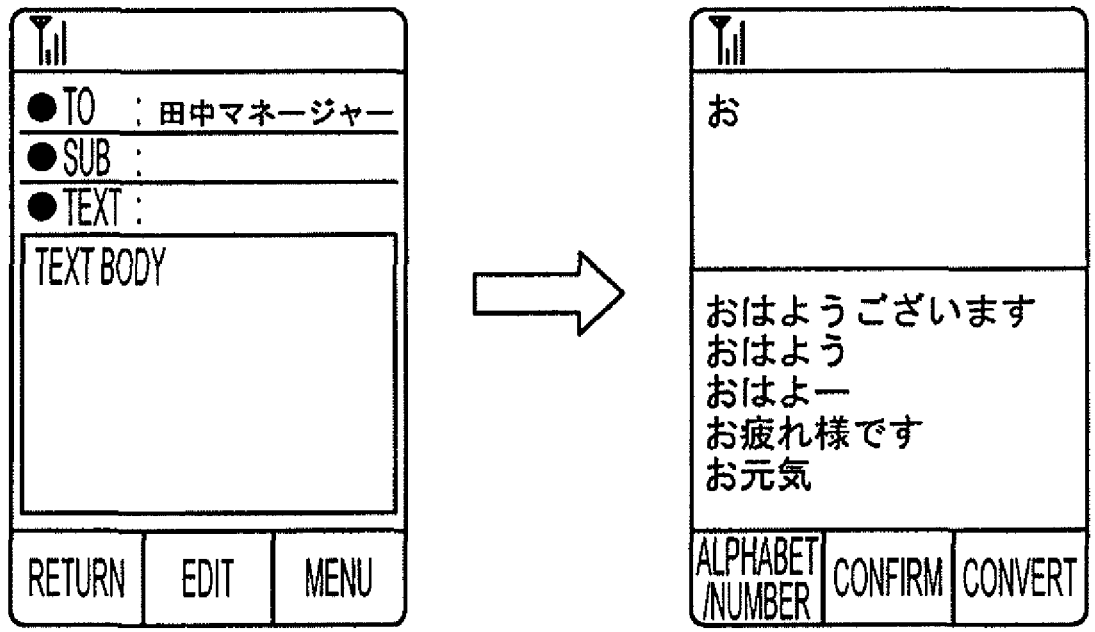
FIGS. 7(1) and (2) are explanatory views showing a display example of the candidate complying with the address.
Figure 7:
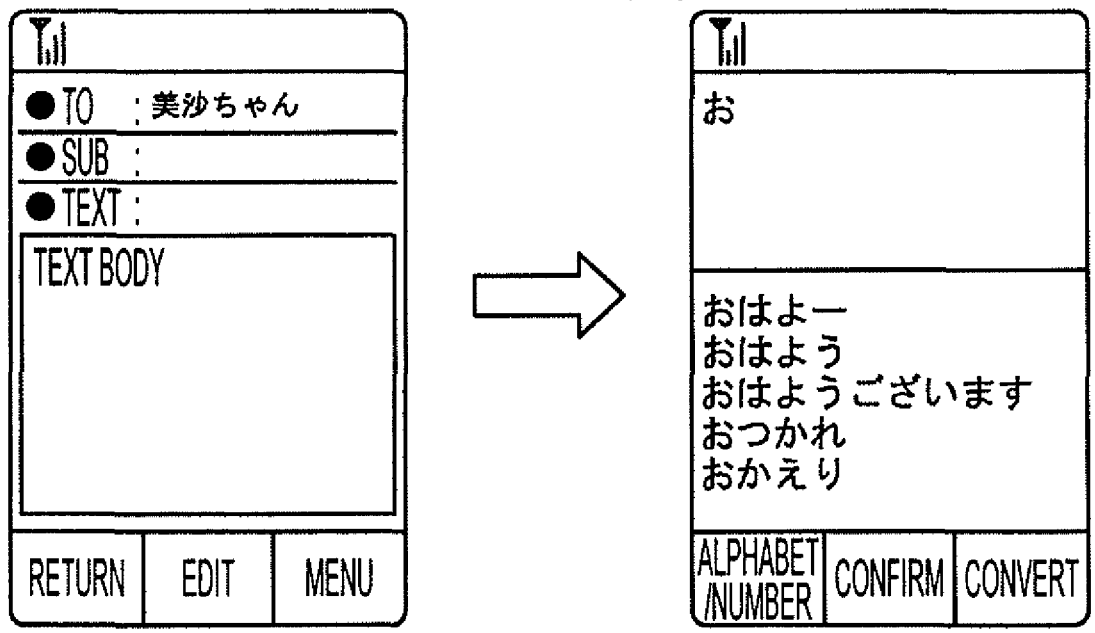

FIG. 7 shows a specific example in which an adjustment value other than zero is set to the attribute data of the [wording], In both two cases (1) and (2) shown in the figure, the read character "お" is input at the beginning of the e-mail document, and the input is made in the morning. However, in the example of FIG. 7(1), the address is "田中マネージャー" (which is a Japanese character), and thus the candidate of polite expression such as "おはようございます" is displayed as the first, whereas in the example of FIG. 7(2), the address is "美砂" (which is a Japanese character), and thus the candidate of strong affinity expression such as "おはよー" is displayed as the first. Such phenomenon occur as different attributes are registered for the [wording] in the "マネージャー" and "ちゃん" contained in the address.

Tables C-3 and C-4 of FIG. 8 show specific examples of the priority adjustment process in the cases of FIGS. 7(1) and 7(2). In the embodiments, the adjustment value of the attribute is set to +18 according to the confirmation of the word registered with the attribute of the [wording], and the set value of the attribute of the opposite concept is set to zero. The adjustment value is set for the [period of time] according to the rule similar to the example of FIG. 6.

The table C-3 corresponds to the case of FIG. 7(1). In this example, [formal] is registered as the attribute of the [wording] in the address "マネ", and thus the adjustment value of +18 is set to [formal] and the adjustment value of zero is set to [casual]. As the input of the read character string "お" is made in the morning, the adjustment value of +11 is set to [morning], and the adjustment value of −10 is set to [night].

According to such setting, in "おはようございます" registered with [formal] of the three candidates ("おはよう", "おはよー", "おはよう" ございます") registered with [morning] for the attribute of the [period of time], +29, which is the total value of the adjustment values of the two attributes, is set for the adjustment value. As a result, the final priority of "おはようございます" becomes 38, and is displayed as the first higher than "おはよう" and "おはよー", which are at higher level in the usual priority.

The [formal] is registered as the attribute of the [wording] in "お疲れ様です", but since the attribute of the [period of time] of such a candidate is [night], the value +8, which is the total of each adjustment value of [night] and [formal] is set for the adjustment value. As a result, the final priority of "お疲れ様です" becomes 17, and is set at the rank lower than "おはよう" and "おはよー".

The table C-4 corresponds to the case of FIG. 7(2). In this embodiment, [casual] of the [wording] is registered for "ちゃん" of the address "美砂ちゃん", and thus the adjustment value of +18 is set to [casual] and the adjustment value of zero is set to [formal]. As the input of the read character string "お" is made in the morning, the value same as in the table C-3 is set for the adjustment values of the [morning] and the [night].

Among the three candidates registered with the [morning] of the [period of time], the adjustment value of +29 is set to "おはよー" registered with [casual]. Thus, the final priority (39) added with such an adjustment value becomes higher than the other candidates registered with only the [morning] ("おはよう" and "おございます"). Furthermore, although [casual] is registered in "おかえり" and "おつかれ", the attribute of the [period of time] thereof is [night] and thus the adjustment value is +8, and the final priority becomes a value lower than "おは and おはようございます". Furthermore, the priority of "お疲れ様です", which is set the fourth in the table C-3, greatly lowers and becomes the last as the adjustment by only the adjustment value of the [night] of −10 is performed.

According to the above description, the candidate suited to the input timing of the read character string is preferentially displayed, and the candidate suited to the attribute of the [wording] of the word contained in the address is most preferentially displayed. Thus, the candidate display intended by the user is realized, and the convenience is greatly improved by changing the display order of the candidates according to the destination of the e-mail and the input timing.

As described above, according to the character input device of the present embodiment, by setting the positive adjustment value to a plurality of attributes of different categories, the priority of the candidate having all such attributes can be increased, and the possibility of displaying such candidates at the level higher than the candidate set with only some of the plurality of attributes can be increased. Furthermore, by setting the negative adjustment value to the attribute contradicting in concept with the attribute set with the positive adjustment value, the priority of the candidate having the attribute not adapted to the input state can be lowered than usual, and the candidate adapted to the input state can be more easily displayed at a higher level.

In each example above, the negative adjustment value is set to the attribute contradicting in concept with the attribute set with the positive adjustment value only for the [period of time], but a predetermined attribute may be similarly set with the negative adjustment value in other categories. The number of attributes set with positive or negative adjustment value is three in FIG. 8, but if the positive or negative adjustment value is set to greater number of attributes in the actual input, a coefficient corresponding to the type of corresponding attribute may be multiplied to each adjustment value to increase or decrease the adjustment value and then the addition process may be performed instead of adding the adjustment value of each attribute as is to the priority with respect to the candidate registered with a plurality of attributes. Alternatively, a maximum value or a minimum value of the adjustment values for every attribute may be selected, and only such value may be added to the priority.

The adjustment of the display order of the candidates is not limited to the candidate display of the kana/kanji character strings, and can also be applied when displaying the candidates of face marks and pictographic characters.

Figure 9:
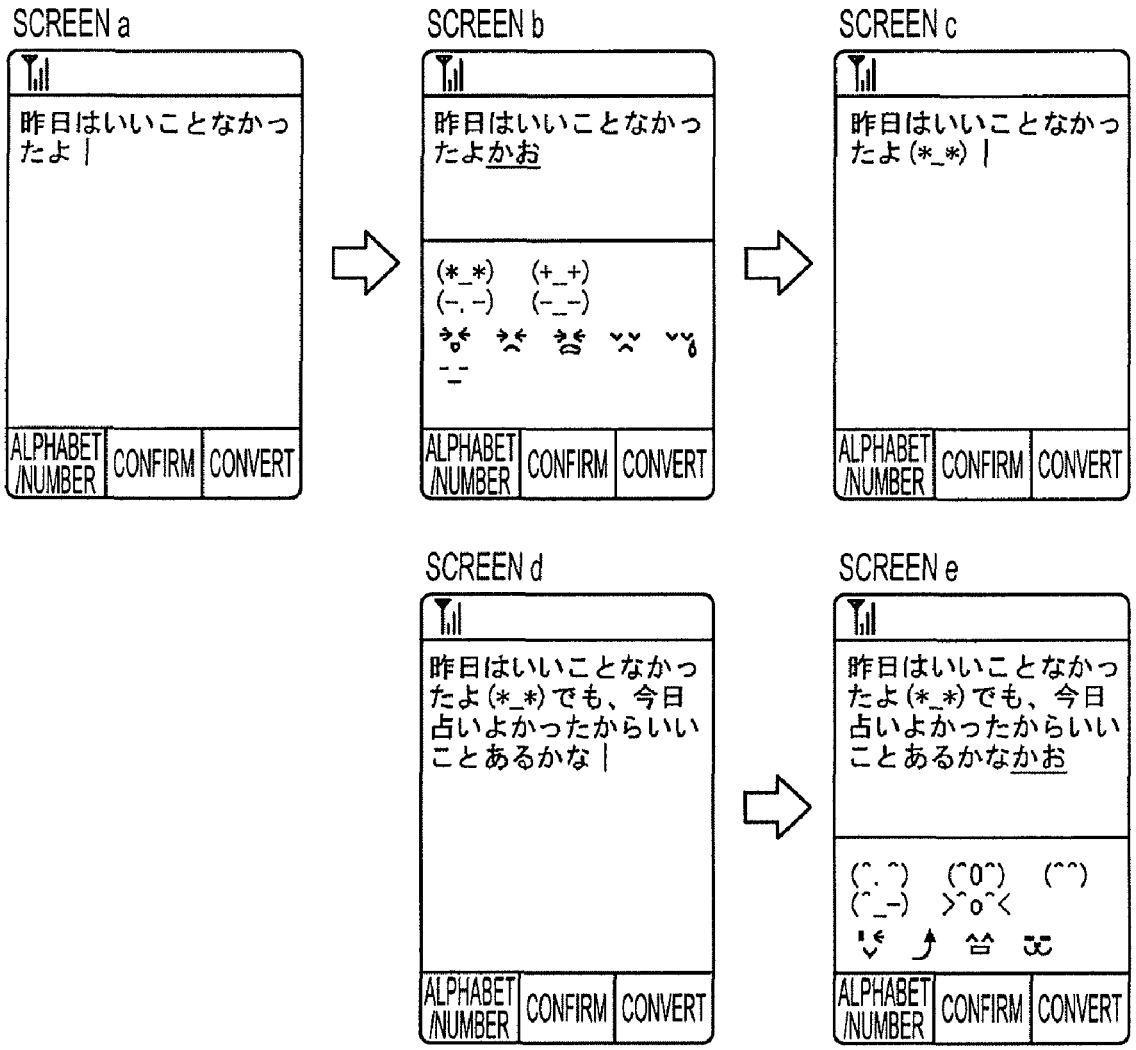
FIG. 9 is an explanatory view showing an example where the display of face mark candidates change according to the confirmed input expression.

FIG. 9 shows a case where the display order of the candidate face marks is adjusted according to the attribute of the confirmed word when creating an e-mail document including the face mark.

According to the figure, a series of sentences "昨日はいいことなかった (which is a Japanese character) (screen a) is confirmed, and then the read character string "かお" (which is a Japanese character) is input and a predetermined number of face mark candidates is displayed according thereto (screen b). One of the candidates is then selected and confirmed (screen c), and a series of sentences "でも、今日占いよかったからいいことあるかな"(which is a Japanese character) is confirmed (screen d). The read character string "かお" is then again input, and the candidates of the face mark corresponding to such input is displayed (screen e), but the candidates different from those displayed in the previous screen b are displayed in the screen e.

The candidate display of screen b is obtained as [negative] of the attribute of the [emotion] is registered to "いいことなかった" confirmed in the previous screen a. In other words, the positive adjustment value is set to the [negative]

according to the confirmation of the word having the attribute of [negative], where as a result of performing the adjustment process by such an adjustment value, the priority of the candidate having the attribute of [negative] of the various face mark candidates extracted by the input of "かお" is increased, and such a candidate is displayed as a higher level candidate.

The candidate display of screen e is obtained as [positive] of the attribute of the [emotion] is registered to "いいことある" confirmed in the previous screen d. In other words, the positive adjustment value set to the previous [negative] is canceled (zero reset) and the positive adjustment value is set to the [positive] according to the confirmation of the word having the attribute of [positive], whereby the priority of the candidate having [positive] of the various face mark candidates is increased, and such a candidate is displayed as a higher level candidate.

As described above, if the attribute is corresponded to the candidate to be displayed, the display order of the candidates can be changed according to the input state even with respect to the display of face marks and pictographic characters. Furthermore, even for the candidates of the kana/kanji character string, if the emotional expression is changed in the middle of creating the document as in the example of FIG. 9, the display order of the candidates can be changed in response to such change.

Moreover, the example of FIG. 9 shows an example where the expression related to the [emotion] is changed, but the reference for defining the display order of the candidates can be changed in the middle of creating the document according to the confirmation of the word having the attribute of the [wording] and the [tense].

For example, explaining the case of creating the document "昨日は楽し かったね。明日も楽しみだな。"(which is a Japanese character) using the tables B-1 and B-2 of FIG. 5, the adjustment value of the [past] is first set to +5 when "昨日" is confirmed, and thus each extracted candidate is displayed in the order shown in the table B-1 when the read character string "たの" is input the first time. When "明日" is then confirmed, the adjustment value of the [past] is zero reset, and the adjustment value of the [future] is set to +5. Thus when "たの" is again input as the read character string, each extracted candidate is displayed in the order shown in the table B-2.

Therefore, every time the word set with the attribute representing the input expression is confirmed, the adjustment value of the category corresponding to such an attribute is updated, and the display order of the candidates is changed accordingly, and thus the change in the expressive form in the middle of creating the document can be flexibly responded. Furthermore, even the creation of short document seen frequently in the mobile telephone can be sufficiently responded as the change is performed according to the confirmation of one word. The update of the adjustment value involved in the confirmation is performed only on the category corresponding to the attribute of the confirmed word, and thus the display order of the candidates can be determined by the adjustment value reflecting all confirmations when the input is confirmed in order for a plurality of categories representing the input expression.

FIGS. 10(1) and 10(2) show display examples at the start of creating the e-mail document. This embodiment is performed when the setting of displaying the candidates at the beginning is selected at the activation of the e-mail editor and the positive value is set to the adjustment value of the [beginning] immediately after the activation of the document creating screen. The positive adjustment value is also set to the attribute of the [wording] of the word contained in the address. The positive adjustment value set to such attributes is a very high value.

In this embodiment, the priority is adjusted targeting on all dictionary data in the converted dictionary, and thereafter, only the candidate which final priority exceeds a predetermined threshold value is displayed. Thus, the [beginning] is registered for the attribute, and only the word registered with the attribute set with the positive adjustment value is displayed as a candidate for the [wording].

In the case of FIG. 10(1), since [formal] of the [wording] is registered to the address "マネージャー" words of polite expression such as "おはようございます" and "お疲れ様です" of the words used at the beginning are displayed. In the case of FIG. 10(2), on the other hand, since [casual] of the [wording] is registered to the address "ちゃん", words of casual wording such as "ありがと" and "おはよー" are displayed.

The procedure of a process the character input device executes in creating the e-mail will now be described. In order to avoid complication of the description, assumption is made that the process of specifying the input mode of the "name of person" and the "name of place", and the process of calling out the candidate of the [beginning] shown in FIGS. 10(1) and 10(2) are not executed.

Figure 11:
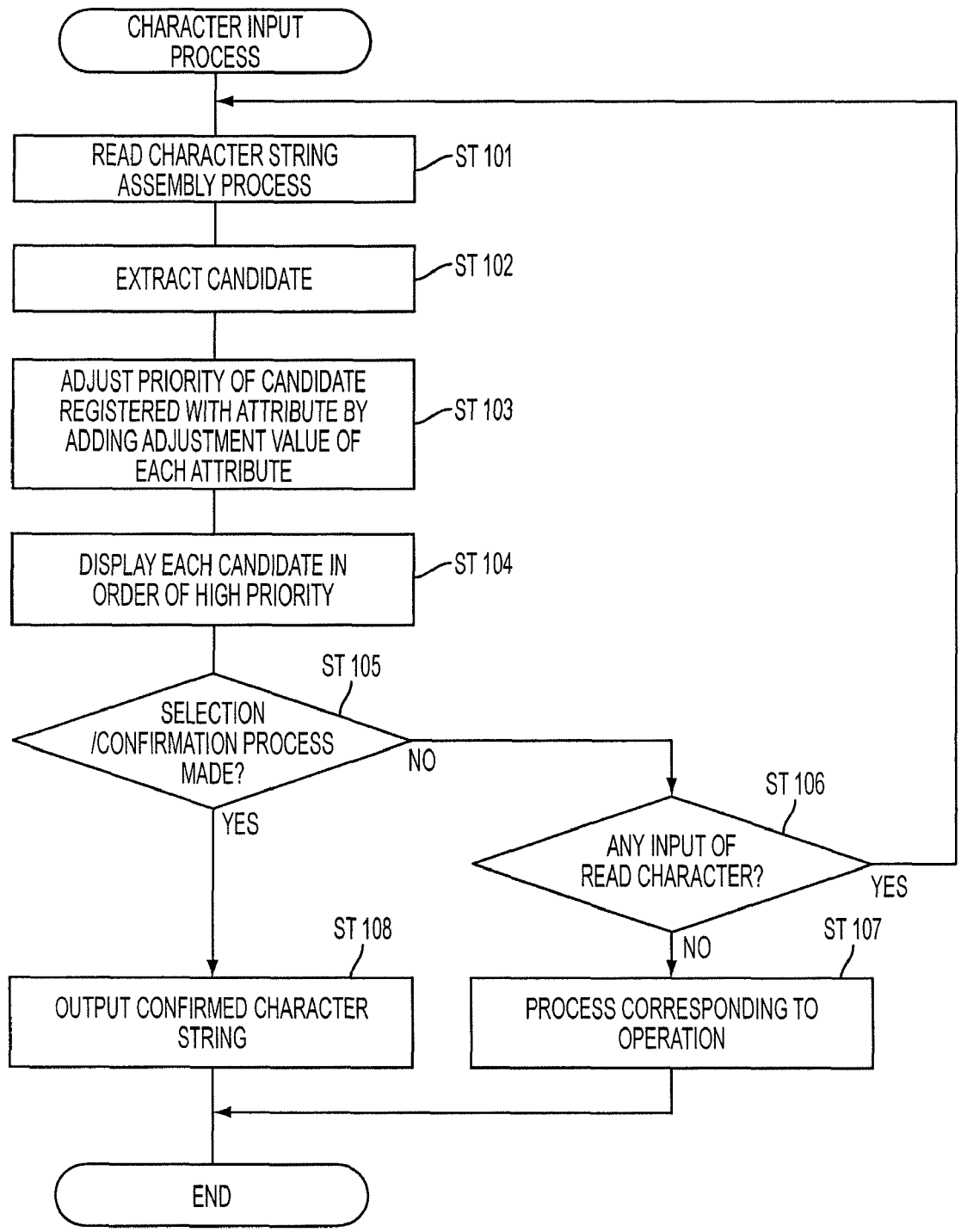
FIG. 11 is a flowchart related to a character input process.

FIG. 11 is a flowchart showing a flow of process executed to input one word to the higher level application. This process is executed by the key input accepting unit 4, the read character string assembly unit 5, the candidate extracting unit 6, the candidate display processing unit 7, the priority adjustment unit 12, the candidate confirmation processing unit 8, and the conversion result output unit 9 shown in FIG. 1.

The procedure will be described with reference to the reference numerals (ST101 to 108) of each step in the figure.

First, when the first operation of the ten key is performed, the kana character corresponding to such operation is set as the first character of the read character string (ST101), and the conversion dictionary 3 is searched with the set read character to extract the candidate (ST102).

The priority of the candidate registered with the attribute of the extracted candidates is adjusted through the process of adding the adjustment value set to each attribute (ST103). Each candidate is then displayed in the order of high priority for all candidates including the candidate not subjected to such adjustment (ST104).

If the candidate for such display is not selected, and the input of the read character is continued (case of "NO" in ST105, "YES" in ST106), the process returns to the first step (ST101), and the read character string is updated according to the new key operation. When the selection and confirmation process of the candidate is performed (case of "YES" in ST105), the confirmed character string is output (ST108) and the process is terminated. When the operation (cancel operation etc.) other than the input or selection/confirmation of the read character string is performed ("NO" in ST105, 106), the process corresponding to such operation is executed, and thereafter, the process is terminated.

Every time the input of the read character is started for the input of a new word while continuing to create the document, the process of each step is executed in order from ST101.

Figure 12:
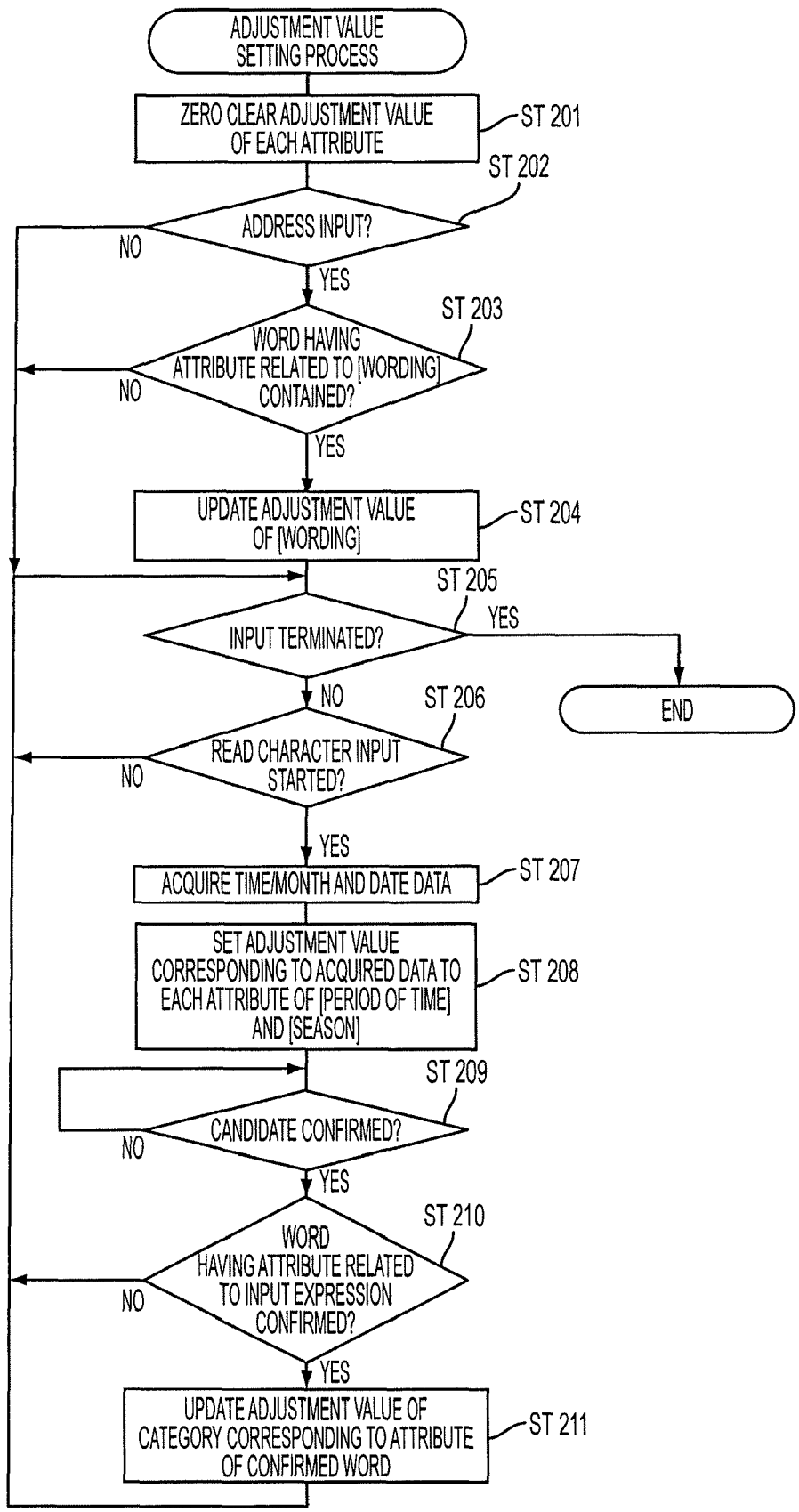
FIG. 12 is a flowchart related to an adjustment value setting process.

FIG. 12 is a flowchart related to the setting process of the adjustment value. This process is executed by the adjustment value setting unit 10 in parallel to the character input process of FIG. 11. However, FIG. 11 shows the processing procedure related to the input of one word, whereas the flowchart of FIG. 12 shows the procedure from the start to the end of creating one e-mail.

The procedures of the adjustment value setting process will be described in detail with reference to the reference numerals ST201 to 211 of each step of the figure.

When the process of creating the e-mail is started, the adjustment value of each attribute is zero cleared (ST201). The address is then input, where ST202 and 203 are "YES" if the word having the attribute related to the [wording] is contained in the address, and the process of updating the adjustment value of the [wording] is executed (ST204). The address is often input by selecting a name registered in the address book, but in such a case, the input address is morphologically analyzed, and the conversion dictionary 3 is referenced with each extracted word to determine whether or not the word having the attribute of the [wording] is present. A table registered with the word having a high frequency of being used in the address of the words having the attribute of the [wording] may be separately registered, and such a table may be referenced.

If the input of the text body or the title is started without inputting the address, or if only the e-mail address is input (case of "NO" in ST202), or if the word having the attribute related to the [wording] is not contained in the address (case of "NO" in ST203), ST204 is skipped.

After the input of the read character is started on the text body or the title, the time data and the month and date data are acquired with reference to the internal clock at the relevant time point (ST206, 207). The adjustment value corresponding to the acquired data is set to each attribute of the [period of time] and the [season] (ST208).

Hereinafter, the process waits until the confirmation operation is performed (until "YES" in ST209), where when the confirmation operation is performed, whether the word having the attribute of the category ([wording], [tense] [emotion]) related to input expression is confirmed is determined. Here, if the word having the attribute of one of the three types of categories is confirmed (case of "YES" in ST210), the adjustment value of the category corresponding to the attribute of the confirmed word is updated (ST211). If the word set with the attribute related to the input expression is not confirmed (case of "NO" in ST210), ST211 is skipped.

Until the creation of the document is terminated (until "YES" in ST205), the adjustment value of each attribute of the [period of time] and the [season] is updated (ST206 to 208) according to the start of input of the new read character, and the adjustment value of the category corresponding to the attribute of the word is updated according to the confirmation of the word set with the attribute related to the input expression (ST209 to 211).

In the above description, the steps (ST207, 208) executed by the start of the read character input are executed in parallel to the read character string assembly process (ST101) and the candidate extraction process (ST102) of FIG. 11, but are completed before the priority adjustment process (ST103) starts. Thus, the attribute set with the adjustment value other than zero exists at least for the [period of time] and the [season] when the first candidate is extracted by the start of the read character input, where if the extracted candidates include the candidate set with such an attribute, the priority of such a candidate is changed to be ranked at the higher level.

According to the above description, every time the word set with the attribute related to the input expression is confirmed, the adjustment value of the category corresponding to the attribute of the confirmed word is updated, and the updated adjustment value is applied to the adjustment of the priority of the candidate extracted the next, and thus confirmation and change can be immediately followed up when the word having the attribute related to input expression is confirmed and when the input expression is changed in the middle of creating the document.

In the embodiment described above, the attribute of the word contained in the address is extracted when setting the adjustment value of the attribute of the [wording] based on the address of the e-mail, but in place thereof, the addresses registered in the address book may be classified into a plurality of categories (e.g., [work] [home], [friend], etc.) in advance to determine the attribute adapted to the created document and set the adjustment value according to the category corresponding to the selected address.

With respect to the [period of time] and the [season], every time the input of a new read character string is started, the adjustment value is set based on the timing data of the internal clock, but in place thereof, whether or not there is change in the period of time or the season may be determined on a constant basis with reference to the internal clock, and the adjustment value may be updated only when determined that there is change. With respect to the [period of time] and the [season] as well, after setting the adjustment value corresponding to the timing data acquired from the internal clock, the adjustment value may be set or updated according to the confirmation of the word having the attribute of the same category in the character input similar to the attribute related to input expression.

In the above described embodiment, the standard priority registered in the conversion dictionary 3 is adjusted by the adjustment value of every attribute, but if the usage frequency of each dictionary data is being learnt, the priority taking such usage frequency into consideration may be adjusted.

The present invention is directed to a character input program incorporating, in a computer, a conversion dictionary including a plurality of dictionary data in which a priority is corresponded to a read character string and a converted character string, and causing the computer to function as each means of read character assembly means for assembling a read character string according to input of a read character; a candidate predicting section for extracting the converted character string that prefix matches the read character string updated from the conversion dictionary as a candidate every time the read character string is updated, and displaying the extracted candidate character strings in a predetermined order; and confirmation outputting means for confirming the selected candidate character string according to a selection operation on the displayed candidate and outputting the confirmed character string to a higher level application operating on the computer. The character input program has the following features.

First, each of a wide variety of attributes representing an input state is corresponded to a predetermined number of dictionary data in the conversion dictionary.

In addition, the candidate predicting section includes adjustment value setting means for determining the input state based on an operation state of the computer where the program is installed or a device incorporating the computer and setting a numerical value of a predetermined magnitude to each attribute as an adjustment value of the priority according to the determination content, priority adjustment means for adjusting the priority of the candidate extracted by the read character string based on the attribute corresponding to the candidate and the adjustment value set by the adjustment value setting means, and display order determining means for determining the display order of each candidate based on the priority after the process by the priority adjustment means.

In the above description, the "input state" means in what state the current character input is being made. For instance, the "input state" includes the timing the character input is executed, the expressive form of the sentences being created, the input mode in the device, and the like. In the conversion dictionary by the program according to the present invention, each of the wide variety of attributes representing the input state is corresponded to a predetermined number of dictionary data, but some dictionary data may not be corresponded with any attribute or may corresponded with a plurality of attributes.

In the device incorporating the program, the input state is determined from the operation state of the own device, and the priority of the extracted candidate is adjusted based on the adjustment value set to each attribute and the attribute set to the candidate extracted by the read character string according to the determination content, and thus the display order of the candidates can be changed according to the state in time of input even if the same read character string is input. Furthermore, the candidate suited to the input state can be displayed at higher level without setting the dictionary of each input state by changing the adjustment value set to each attribute according to the input state.

According to a preferred aspect of the program, the adjustment value setting means sets the adjustment value of the attribute adapted to the determined input state to a positive value, and sets the adjustment value of the attribute not adapted to the input state to zero or a negative value. According to such a configuration, the candidate adapted to the input state can be displayed at higher level since the priority of the candidate adapted to the determined input state can be set higher than the candidate not adapted to the input state.

According to another preferred aspect, the adjustment value setting means sets the adjustment value of the priority of each attribute so that when determining a plurality of input states in the determination of the input state, a highest adjustment value is added to the priority of the candidate corresponded with all attributes adapted to the input states. According to such a configuration, if the element representing the input state is in plurals, the priority of the candidate adapted to all elements is set the highest and thus such a candidate can be displayed at higher level.

According to still another preferred aspect, the attribute contains a wide variety of data indicating a timing the read character string is input, the determining means determines the timing the read character string is input based on timing information of an internal clock of the device incorporating the computer. According to such a configuration, the priority of the candidate adapted to the timing the read character string is input can be set high and such a candidate can be displayed at higher level.

According to yet another preferred aspect, the attribute contains a wide variety of data representing input expression; and every time a candidate corresponded with the attribute representing the input expression is confirmed by confirmation means, the adjustment value setting means sets the adjustment value of the attribute corresponding to the candidate to a positive value, and sets the adjustment value of the attribute not adapted to the input expression represented by the attribute to zero or a negative value.

According to such a configuration, the priority of the candidate having the attribute adapted to the input expression of the document confirmed first can be set higher than other candidates to display such a candidate at a higher level. Since the adjustment value is set every time the candidate corresponded with the attribute representing the input expression is confirmed, the display order of the candidates can easily follow the change even if the input expression is changed in the middle of creating the document, thereby enhancing the convenience.

The program can be installed in an information processing device including an operation unit and a display unit and executing an application that requires character input such as a mobile telephone, a personal digital assistance (PDA), and a game machine. The memory of the device installed with the program is stored with a conversion dictionary including a plurality of dictionary data in which a priority is corresponded to the read character string and the converted character string, and having a configuration in which each of the wide variety of attributes representing an input state is corresponded to a predetermined number of dictionary data. The computer configuring the control unit of the device functions as each means of read character assembly means for assembling a read character string according to the input of a read character from the operation unit; a candidate predicting section for extracting a converted character string that prefix matches the read character string updated from the conversion dictionary as a candidate every time the read character string is updated, and displaying the extracted candidate on the display unit in a predetermined order; and confirmation outputting means for confirming the selected candidate character string according to a selection operation on the displayed candidate and outputting the confirmed character string. The candidate predicting section is arranged with adjustment value setting means for determining the input state based on an operation state of an own device and setting a numerical value of a predetermined magnitude to each attribute as an adjustment value of the priority according to the determination content, priority adjustment means for adjusting the priority of the candidate extracted by the read character string based on the attribute corresponding to the candidate and the adjustment value set by the adjustment value setting means, and display order determining means for determining the display order of each candidate based on the priority after the process by the priority adjustment means.

The present invention is also directed to a character input method in a computer connected with an operation unit and a display unit and incorporating a conversion dictionary including a plurality of dictionary data in which a priority is corresponded to a read character string and a converted character string, the method including executing in a predetermined cycle a first step of assembling a read character string according to input of a read character from the operation unit and a second step of extracting the converted character string that prefix matches the read character string updated from the conversion dictionary as a candidate according to the update of the read character string, and displaying the extracted candidate character strings on the display unit in a predetermined order; confirming the selected candidate character string when a selection operation is performed on the candidate displayed by the execution of the second step; and outputting the confirmed character string to a higher level application operating on the computer; wherein the conversion dictionary is configured so that each of a wide variety of attributes representing an input state is corresponded to a predetermined number of dictionary data.

The second steps includes the steps of determining the input state based on an operation state of the computer or a device incorporating the computer and setting a numerical value of a predetermined magnitude to each attribute as an adjustment value of the priority according to the determination content, adjusting the priority of the candidate extracted by the read character string based on the attribute corresponding to the candidate and the adjustment value set to the attribute, and determining the display order of each candidate based on the priority after the termination of the adjustment process.

According to the character input program, the character input device, and the character input method, the process of displaying each candidate extracted from the conversion dictionary in an order corresponding to the input state can be easily performed. Since the conversion dictionary is configured by corresponding the attribute representing the input state to the dictionary data of known configuration, the data configuration does not become complex, and the calculation for search and priority adjustment can be performed at high speed. The memory resource can be efficiently used as the dictionary file does not need to be switched according to the input state.

What is claimed is:

1. A computer programmed to implement a character input program the computer comprising:
    a conversion dictionary including a plurality of dictionary data in which a priority is corresponded to a read character string and a converted character string, and the program causing the computer to function as each unit of a read character assembly unit for assembling a read character string according to input of a read character;
    a candidate predicting section programmed for extracting the converted character strings that prefix match the read character string updated from the conversion dictionary as candidates each time an input read character is added to the read character string, and displaying the extracted candidate character strings in a predetermined display order; and
    a confirmation outputting unit programmed for confirming a selected candidate character string according to a selection operation on the displayed candidate character strings and outputting the confirmed character string to a higher level application operating on the computer,
    wherein each of a variety of attributes representing an input state is corresponded to a predetermined number of dictionary data in the conversion dictionary, and
    wherein the candidate predicting section includes:
        an adjustment value setting unit programmed for determining the input state based on an operation state of the computer or a device incorporating the computer and setting a numerical value of a predetermined magnitude to each attribute as an adjustment value of the priority according to the input state,
        a priority adjustment unit programmed for adjusting the priority of the converted candidate string to be extracted by the read character string based on the attribute corresponding to the converted candidate string and the adjustment value set by the adjustment value setting unit, and
        a display order determining unit programmed for determining the predetermined display order of each extracted candidate character string based on the priority after the process by the priority adjustment unit,
    wherein categories are set with two types of attributes which have concepts that contradict each other,
    wherein each attribute contains a variety of data representing input expression, and
    wherein every time a candidate corresponded with one of the two types of attributes associated with a category and representing the input expression is confirmed by the confirmation outputting unit, the adjustment value setting unit sets the adjustment value of the attribute corresponding to the candidate to a positive value, and sets the adjustment value of the attribute having the contradictory concept to the attribute representing the input expression to zero or a negative value.

2. The computer according to claim 1, wherein the adjustment value setting unit sets the adjustment value of the attribute adapted to the determined input state to a positive value, and sets the adjustment value of the attribute not adapted to the input state to zero or a negative value.

3. The computer according to claim 2, wherein the adjustment value setting unit sets the adjustment value of the priority of each attribute so that when determining a plurality of input states in the determination of the input state, a highest adjustment value is added to the priority of the converted candidate string corresponded with all attributes adapted to the input states.

4. The computer according to claim 1, wherein the attribute contains a variety of data indicating a timing the read character string is input, the determining unit determines the timing the read character string is input based on timing information of an internal clock of the device incorporating the computer.

5. A character input device comprising:
    an operation unit and a display unit;
    a memory storing a conversion dictionary including a plurality of dictionary data in which a priority is corresponded to a read character string and a converted character string;
    a read character assembly unit for assembling a read character string according to input of a read character from the operation unit;
    a candidate predicting section for extracting character strings that prefix match the read character string updated from the conversion dictionary as candidates each time an input read character is added to the read character string, and displaying the extracted character strings on the display unit in a predetermined display order; and
    a confirmation outputting unit for confirming and outputting a selected candidate character string according to a selection operation on the displayed candidate,
    wherein each of a variety of attributes representing an input state is corresponded to a predetermined number of dictionary data in the conversion dictionary, and
    wherein the candidate predicting section includes:
        an adjustment value setting unit for determining the input state based on an operation state of an own device and setting a numerical value of a predetermined magnitude to each attribute as an adjustment value of the priority according to the input state,
        a priority adjustment unit for adjusting the priority of the character string extracted by the read character string based on the attribute corresponding to the character string and the adjustment value set by the adjustment value setting unit, and
        a display order determining unit for determining the display order of each extracted character string based on the priority after the process by the priority adjustment unit,
    wherein categories are set with two types of attributes which have concepts that contradict each other,
    wherein each attribute contains a variety of data representing input expression, and
    wherein every time a candidate corresponded with one of the two types of attributes associated with a category and representing the input expression is confirmed by the confirmation outputting unit, the adjustment value setting unit sets the adjustment value of the attribute corresponding to the candidate to a positive value, and sets the adjustment value of the attribute having the contradictory concept to the attribute representing the input expression to zero or a negative value.

6. A character input method carried out by a computer connected with an operation unit and a display unit and incorporating a conversion dictionary including a plurality of dictionary data in which a priority is corresponded to a read character string and a converted character string, the method including:
  executing in a predetermined cycle a first step of assembling a read character string according to input of a read character from the operation unit and a second step of extracting the converted character string that prefix matches the read character string updated from the conversion dictionary as a candidate with each input of a read character added to the read character string, and displaying the extracted candidate character strings on the display unit in a predetermined display order;
  confirming a selected candidate character string when a selection operation is performed on the candidate displayed by the execution of the second step; and
  outputting the confirmed character string to a higher level application operating on the computer,
  wherein the conversion dictionary is configured so that each of a variety of attributes representing an input state is corresponded to a predetermined number of dictionary data, and
  wherein the second steps includes the steps of:
    determining the input state based on an operation state of the computer or a device incorporating the computer and setting a numerical value of a predetermined magnitude to each attribute as an adjustment value of the priority according to the input state,
    adjusting the priority of the converted character string extracted by the read character string based on the attribute corresponding to the converted character string and the adjustment value set to the attribute, and
    determining the display order of each extracted candidate character string based on the priority after the termination of the adjustment process,
  wherein categories are set with two types of attributes which have concepts that contradict each other,
  wherein each attribute contains a variety of data representing input expression, and
  wherein every time a candidate corresponded with one of the two types of attributes associated with a category and representing the input expression is confirmed by the confirmation outputting unit, the adjustment value setting unit sets the adjustment value of the attribute corresponding to the candidate to a positive value, and sets the adjustment value of the attribute having the contradictory concept to the attribute representing the input expression to zero or a negative value.

* * * * *